Oct. 8, 1968  C. V. ARNTZ ET AL  3,404,672
COOKING STOVE
Filed May 29, 1967
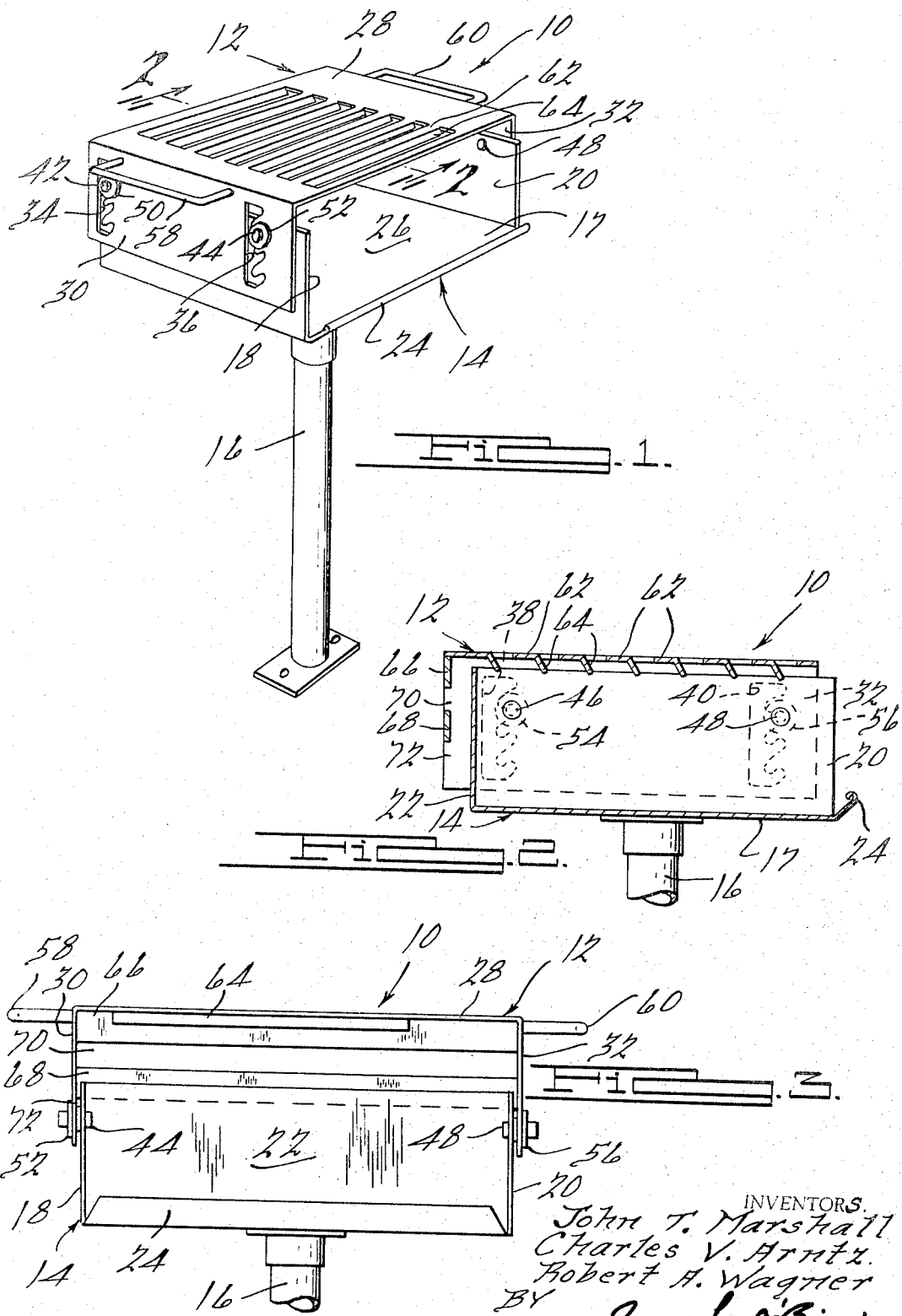
INVENTORS.
John T. Marshall
Charles V. Arntz
Robert A. Wagner
BY
James L. O'Brien
ATTORNEY.

United States Patent Office 3,404,672
Patented Oct. 8, 1968

3,404,672
COOKING STOVE
Charles V. Arntz, Clarkston, John T. Marshall, Orchard Lake, and Robert A. Wagner, Drayton Plaines, Mich., assignors to Hancock Iron Works, Inc., Pontiac, Mich., a corporation of Michigan
Filed May 29, 1967, Ser. No. 641,859
4 Claims. (Cl. 126—25)

ABSTRACT OF THE DISCLOSURE

A cooking stove having a grill top with depending sides adapted to adjustably overlap the stationary sides of the stove base in spaced relation to reduce heat transfer to the external sides. The grill top having parallel bars with turned down flanges to deflect rising gases toward the rear of the stove.

Field of the invention

Park type cooking stove having a firebox with an adjustable but non-removable grill.

Description of the prior art

One form of outdoor stove is shown in U.S. Patent No. 3,053,245 to Beller wherein the stove has a pedestal mounted base with attached back and sides and a single plane grill having handles projecting therefrom to adjustably engage slots in the sides. The grill is rendered non-removable by welding bars across the tops of the slots after the grill is installed. The grill of Beller moves inside the base member which prevents cooking utensils or barbecue spit attachments from extending beyond the grill area. The handles of the Beller device are an extension of the grill bars which are directly exposed to the firebox and thus are likely to be too hot to permit grill adjustment after the fire has started.

Summary

The stove of the present invention is provided with a grill member which may be manufactured relatively inexpensively from a single sheet of metal. The depending sides of the grill member are adjustably secured to the sides of the base member to permit the grill to be raised and lowered without diminution of useful grill area or interference between the base member and cooking utensils or barbecue spit attachments carried by the grill. The top of the grill is provided with a plurality of bars each having a turned down longitudinal flange sloping angularly from the front of the stove toward the back to increase the draft through the firebox and to deflect the smoke away from the front of the stove. One or more bars may be secured to the back of the grill member to coact with the back of the base member to provide draft control as the grill member is raised and lowered. The sides of the grill member are external of and spaced from the sides of the base member to permit the grill to be lowered without interference with the fuel in the base member and also provides for reduced heat transfer to the grill sides and attached handles.

These and other objects and advantages of the present invention will become readily apparent from the following detailed description taken in connection wth the appended drawings in which:

FIGURE 1 is a perspective view of a stove embodying the present invention;

FIGURE 2 is a sectional view taken along line 2—2 of FIGURE 1; and

FIGURE 3 is a front view of the stove of FIGURE 1 showing the grill in its raised position.

Description of the preferred embodiment

Referring now to the drawings and more particularly to FIGURE 1, numeral 10 designates a stove having a grill member 12 and a base member 14 supported by a pedestal 16. The base member 14 is formed with a bottom 17, attached sides 18 and 20, and back 22. The front of the base member is open except for a turned up lip 24 which helps hold the fire in the firebox 26, defined by the base member, and yet permits the firebox to be easily cleaned and drained.

The grill member 12 may be manufactured from a single sheet of metal and is provided with a top 28, and turned over depending sides 30 and 32. Side 30 is formed with a pair of stepped slots 34 and 36 and side 32 is provided with corresponding slots 38 and 40. Slots 34, 36, 38 and 40 respectively engage abutments or studs 42 and 44 secured to side 18 of the base member and abutments or studs 46 and 48 secured to side 20 of the base member. Each abutment is provided with a washer, respectively designated 50, 52, 54 and 56, which overlaps the slot in which its associated abutment is located. Each abutment is inserted through its respective slot and secured as by welding to a side 18 or 20 of the base member. In this manner the grill is adjustably but non-removably mounted on the base member. Handles 58 and 60, of generally U-shaped configuration, are respectively secured to sides 30 and 32 to facilitate adjustment of the grill member 12. The sides 30 and 32 of the grill member are external of and spaced from the adjacent sides 18 and 20, respectively, of the base member 14. The top 28 of the grill member is formed with a plurality of parallel bars 62 each of which has a turned down longitudinal flange 64 sloping angularly from the front of the stove toward the back, as best seen in FIGURE 2. It has been found that the arrangement of bars 62 and flange 64 actually helps the draft through the firebox 26 and also deflects the smoke toward the back of the stove away from the cook's face.

The grill member 12 may be formed from a single sheet of metal and the slots 34, 36, 38 and 40 and the bars 62 and flange 64 may be readily formed simultaneously or sequentially as desired. After the slots are formed, the ends of the grill member are turned over to form the sides 30 and 32.

As best seen in FIGURES 2 and 3, straps 66 and 68 may be secured to the back of grill member 12 to provide open spaces 70 and 72 to break the draft in the firebox as the grill member is raised to predetermined positions.

Although the present invention has been described with reference to a preferred embodiment, it will be readily apparent to those skilled in the art that various changes and modifications can be made without departing from the scope of our invention.

We claim:

1. A stove having a base with attached back and sides, a grill member forming the top of said stove and having depending sides adapted to at least partially overlap said first mentioned sides and coacting slot and abutment means formed on adjacent first and second mentioned sides for adjustably supporting said grill member.

2. The stove of claim 1 wherein the depending sides of the grill member are external of and spaced from the sides of the base.

3. The stove of claim 1 wherein the top of the grill member is formed with a plurality of substantially parallel bars each having a turned down longitudinal flange sloping angularly from the front of the stove to the back whereby rising gases passing through the grill member are deflected by the bars and flanges toward the back of the stove.

4. The stove of claim 1 wherein the grill member is formed with a back plate adapted to overlap the back of said base when the grill member is in its lowest position and to be spaced from the back of the base when the grill member has been raised a predetermined amount.

References Cited

UNITED STATES PATENTS

| | | | |
|---|---|---|---|
| 3,973 | 3/1845 | Hawkins | 99—450 |
| 2,325,828 | 8/1943 | Betts. | |
| 3,119,387 | 1/1964 | Beller. | |

FREDERICK KETTERER, *Primary Examiner.*